(12) United States Patent
Schlunke et al.

(10) Patent No.: US 9,969,493 B2
(45) Date of Patent: May 15, 2018

(54) AERODYNAMIC LIFTING DEVICE

(71) Applicant: ENTECHO PTY LTD., Osborne Park, Western Australia (AU)

(72) Inventors: Kim Christopher Schlunke, City Beach (AU); Ken Seeber, Wanneroo (AU); Rodney Lamb, Indooroopilly (AU)

(73) Assignee: ENTECHO PTY LTD., Western Australia (AU)

( * ) Notice: Subject to any disclaimer, the term of this patent is extended or adjusted under 35 U.S.C. 154(b) by 100 days.

(21) Appl. No.: 14/900,233

(22) PCT Filed: Jun. 30, 2014

(86) PCT No.: PCT/AU2014/050102
§ 371 (c)(1),
(2) Date: Dec. 21, 2015

(87) PCT Pub. No.: WO2015/000028
PCT Pub. Date: Jan. 8, 2015

(65) Prior Publication Data
US 2016/0152338 A1    Jun. 2, 2016

(30) Foreign Application Priority Data

Jul. 1, 2013  (AU) ................................ 2013902429
Jul. 1, 2013  (AU) ................................ 2013902430
Jul. 1, 2013  (AU) ................................ 2013902431

(51) Int. Cl.
*B64C 23/00*    (2006.01)
*B64C 39/06*    (2006.01)
(Continued)

(52) U.S. Cl.
CPC ........... *B64C 39/064* (2013.01); *A63H 27/12* (2013.01); *B60V 1/046* (2013.01); *B60V 3/06* (2013.01)

(58) Field of Classification Search
CPC .............. B64C 39/064; B64C 29/0025; B64C 29/0066; B64C 29/0058; B64C 23/005;
(Continued)

(56) References Cited

U.S. PATENT DOCUMENTS 1,771,053 A * 7/1930 Martin .................... B64C 39/00
                                                     244/113
2,876,965 A * 3/1959 Streib ..................... B64C 39/06
                                                     244/12.2
(Continued)

FOREIGN PATENT DOCUMENTS

AU        2008202134        12/2008
EP        1048904           11/2000
(Continued)

OTHER PUBLICATIONS

Supplementary European Search Report issued in corresponding European Application No. EP 14 82 0445 dated Jan. 5, 2017.
(Continued)

*Primary Examiner* — Medhat Badawi
(74) *Attorney, Agent, or Firm* — Hogan Lovells US LLP

(57) ABSTRACT

An aerodynamic lifting device comprises a chassis (200); a rotor (120) having a rotational axis (R) and a plurality of rotor blades (123) disposed in an annular ring about the rotational axis (R) supported by the chassis (200); and a torque transmission means (126,130,139) to provide tractive force for rotating the rotor (120). The torque transmission means (126,130,139) co-operates with at least one complementary and circumferentially extending drive surface (126a, 126b) of the rotor (120) to transmit tractive force as
(Continued)

tangential forces and resultant torque sufficient to drive the rotor (120) and thereby generate lift. The aerodynamic lifting device may be used in airborne craft which may be deployed for waterborne use with a buoyant chassis (200), especially of toroidal shape, for elevating the rotor (120) above a water surface (300) during take off and landing.

18 Claims, 12 Drawing Sheets

(51) Int. Cl.
  *A63H 27/00* (2006.01)
  *B60V 1/04* (2006.01)
  *B60V 3/06* (2006.01)
(58) Field of Classification Search
  CPC ....... B64C 27/20; B64C 39/001; B64C 39/06; A63H 27/12; B60V 1/046; B60V 3/06
  See application file for complete search history.

(56) References Cited

U.S. PATENT DOCUMENTS

| | | | | |
|---|---|---|---|---|
| 2,927,746 A * | 3/1960 | Mellen | B64C 39/064 | 180/117 |
| 2,935,275 A * | 5/1960 | Grayson | B64C 39/001 | 244/23 C |
| 3,041,012 A * | 6/1962 | Gibbs | B64C 39/001 | 244/17.23 |
| 3,045,951 A * | 7/1962 | Freeland | B64C 29/0025 | 180/117 |
| 3,051,414 A * | 8/1962 | Frost | B64C 39/001 | 180/129 |
| 3,067,967 A * | 12/1962 | Barr | B64C 39/001 | 180/129 |
| 3,082,977 A * | 3/1963 | Arlin | B64C 29/0025 | 244/12.2 |
| 3,103,325 A * | 9/1963 | Leutzinger | B64C 39/001 | 244/12.1 |
| 3,107,071 A * | 10/1963 | Wessels | B64C 39/001 | 180/129 |
| 3,288,235 A * | 11/1966 | Stanton | B60V 1/06 | 180/122 |
| 3,410,507 A * | 11/1968 | Moller | B64C 39/001 | 244/23 C |
| 3,465,989 A * | 9/1969 | Bowshier | B64C 39/001 | 244/17.19 |
| 3,507,461 A * | 4/1970 | Rosta | B64C 27/08 | 244/12.2 |
| 3,514,053 A * | 5/1970 | McGuinness | B64C 29/0066 | 244/12.2 |
| 3,519,224 A * | 7/1970 | Boyd | B64C 29/0066 | 244/100 R |
| 3,558,080 A * | 1/1971 | Kretz | B64G 1/58 | 244/1 R |
| 3,568,955 A * | 3/1971 | McDevitt | B64C 29/0066 | 244/23 C |
| 3,614,030 A * | 10/1971 | Moller | B64C 29/0025 | 244/23 C |
| 3,632,065 A * | 1/1972 | Rosta | B64C 27/20 | 244/12.2 |
| 3,640,489 A * | 2/1972 | Jaeger | B64C 39/001 | 244/23 C |
| 3,677,503 A * | 7/1972 | Freeman, Jr. | B64C 11/001 | 244/23 C |
| 3,690,597 A * | 9/1972 | Di Martino | B64C 27/20 | 244/23 C |
| 3,774,865 A * | 11/1973 | Pinto | B64C 39/001 | 244/205 |
| 3,838,835 A * | 10/1974 | Kling | B64C 27/20 | 244/23 C |
| 3,933,325 A * | 1/1976 | Kaelin | B64C 39/001 | 244/23 C |
| 4,014,483 A * | 3/1977 | MacNeill | B64B 1/02 | 244/137.2 |
| 4,023,751 A * | 5/1977 | Richard | B64C 39/001 | 244/23 C |
| 4,050,652 A * | 9/1977 | DeToia | B64C 39/001 | 244/12.2 |
| 4,208,025 A * | 6/1980 | Jefferson | B64C 27/00 | 244/12.2 |
| 4,214,720 A * | 7/1980 | DeSautel | B64C 39/001 | 244/12.2 |
| 4,461,436 A * | 7/1984 | Messina | B64C 27/20 | 244/23 C |
| 4,781,642 A * | 11/1988 | Stanzel | A63H 27/14 | 446/38 |
| 4,807,830 A * | 2/1989 | Horton | B64C 39/001 | 244/12.2 |
| 4,994,660 A * | 2/1991 | Hauer | F02K 1/008 | 239/265.19 |
| 5,039,014 A * | 8/1991 | Lippmeier | F02K 1/12 | 239/265.33 |
| 5,039,031 A * | 8/1991 | Valverde | B64C 39/001 | 244/12.2 |
| 5,064,143 A * | 11/1991 | Bucher | B64C 27/10 | 244/12.2 |
| 5,072,892 A * | 12/1991 | Carrington | B64C 39/001 | 244/12.2 |
| 5,213,284 A * | 5/1993 | Webster | B64C 39/001 | 244/12.2 |
| 5,259,571 A * | 11/1993 | Blazquez | B64C 39/001 | 244/12.2 |
| 5,269,467 A * | 12/1993 | Williams | F02K 1/008 | 239/265.19 |
| 5,318,248 A * | 6/1994 | Zielonka | B64C 39/001 | 244/12.2 |
| 5,344,100 A * | 9/1994 | Jaikaran | B64C 27/20 | 244/12.2 |
| 5,351,888 A * | 10/1994 | Taylor | B64D 33/08 | 239/127.3 |
| 5,437,411 A * | 8/1995 | Renggli | F02K 1/805 | 239/265.39 |
| 5,485,959 A * | 1/1996 | Wood | F02K 1/002 | 239/265.19 |
| 5,503,351 A * | 4/1996 | Vass | B64C 39/064 | 244/12.2 |
| 5,507,453 A * | 4/1996 | Shapery | B64C 29/0025 | 244/12.2 |
| 5,524,827 A * | 6/1996 | Znamensky | F02K 1/08 | 239/265.33 |
| 5,653,404 A * | 8/1997 | Ploshkin | B63G 8/00 | 244/12.2 |
| 5,803,199 A * | 9/1998 | Walter | B60V 1/11 | 180/117 |
| 6,050,520 A * | 4/2000 | Kirla | B64C 39/06 | 244/10 |
| 6,067,793 A * | 5/2000 | Urruela | F02K 1/1223 | 239/265.33 |
| 6,113,029 A * | 9/2000 | Salinas | B64C 29/0016 | 244/12.6 |
| 6,189,332 B1 * | 2/2001 | Ota | B29C 71/02 | 416/241 A |
| 6,192,671 B1 * | 2/2001 | Elorriaga | F02K 1/008 | 239/265.39 |
| 6,195,981 B1 * | 3/2001 | Hanley | F02K 1/008 | 239/265.35 |
| 6,212,877 B1 * | 4/2001 | Renggli | F02K 1/008 | 239/265.35 |
| 6,270,036 B1 * | 8/2001 | Lowe, Jr. | B64B 1/00 | 244/12.2 |
| 6,352,219 B1 * | 3/2002 | Zelic | B64C 39/005 | 244/12.1 |
| 6,368,062 B1 * | 4/2002 | Yagami | F04D 29/282 | 416/178 |
| 6,382,560 B1 * | 5/2002 | Ow | B64C 27/20 | 244/12.2 |

(56) References Cited

U.S. PATENT DOCUMENTS

| | | | | |
|---|---|---|---|---|
| 6,405,976 | B1* | 6/2002 | Jacoby | B64C 27/20 244/34 R |
| 6,450,445 | B1* | 9/2002 | Moller | B64C 29/02 244/12.1 |
| 6,575,401 | B1* | 6/2003 | Carver | B64C 27/20 244/12.2 |
| 6,616,094 | B2* | 9/2003 | Illingworth | B64C 11/001 244/12.1 |
| 6,669,138 | B1* | 12/2003 | Arrieta | B64C 39/064 244/12.2 |
| 6,672,539 | B1* | 1/2004 | Schoeneck | B64C 27/20 244/12.2 |
| 6,802,693 | B2* | 10/2004 | Reinfeld | B64C 11/001 415/1 |
| 6,837,457 | B2* | 1/2005 | Kirjavainen | B64C 39/001 244/12.2 |
| 6,843,699 | B2* | 1/2005 | Davis | A63H 27/04 244/23 C |
| 7,147,183 | B1* | 12/2006 | Carr | B64C 39/064 244/12.2 |
| 7,407,132 | B2* | 8/2008 | Kirjavainen | B64C 39/001 180/117 |
| 7,465,236 | B2* | 12/2008 | Wagels | A63G 31/00 434/34 |
| 7,556,218 | B2 | 7/2009 | Schlunke | |
| 7,604,198 | B2* | 10/2009 | Petersen | B64C 27/10 244/17.23 |
| 7,857,256 | B2* | 12/2010 | Hatton | B64C 39/064 244/12.2 |
| 7,971,823 | B2* | 7/2011 | Martin | B64C 17/06 244/12.2 |
| 8,181,902 | B2* | 5/2012 | Schlunke | B64C 39/064 244/12.2 |
| 8,353,199 | B1* | 1/2013 | Ma | A63H 27/12 108/136 |
| 8,646,721 | B2 | 2/2014 | Chapman et al. | |
| 8,991,743 | B1* | 3/2015 | Pope | B64C 27/82 244/17.11 |
| 2002/0142699 | A1* | 10/2002 | Davis | A63H 27/12 446/37 |
| 2004/0237534 | A1* | 12/2004 | Webster | B64D 33/04 60/771 |
| 2005/0230525 | A1* | 10/2005 | Paterro | B64C 39/001 244/23 B |
| 2006/0113425 | A1* | 6/2006 | Rader | B64C 15/00 244/17.11 |
| 2006/0214052 | A1* | 9/2006 | Schlunke | B64C 39/064 244/12.2 |
| 2009/0016877 | A1* | 1/2009 | Schlunke | B64C 39/064 415/208.1 |
| 2010/0051754 | A1* | 3/2010 | Davidson | B64C 39/06 244/23 C |
| 2010/0264256 | A1* | 10/2010 | Yim | B64C 27/20 244/17.23 |
| 2010/0320333 | A1* | 12/2010 | Martin | B64C 17/06 244/23 A |
| 2011/0139923 | A1* | 6/2011 | Papanikolopoulos | A63H 27/12 244/2 |
| 2011/0155860 | A1* | 6/2011 | Chapman | B64C 27/20 244/23 A |
| 2012/0306332 | A1* | 12/2012 | Cardell | A63H 27/12 312/223.1 |
| 2013/0206915 | A1* | 8/2013 | Desaulniers | B64C 39/024 244/165 |
| 2013/0240025 | A1* | 9/2013 | Bersano | F24J 2/5241 136/251 |
| 2016/0152327 | A1* | 6/2016 | Bertels | B64C 11/001 417/423.7 |

FOREIGN PATENT DOCUMENTS

| | | |
|---|---|---|
| EP | 1916405 | 4/2008 |
| FR | 2729917 | 8/1996 |
| GB | 881785 | 11/1961 |
| GB | 958842 | 5/1964 |
| GB | 1361036 | 7/1974 |
| GB | 2360752 | 10/2001 |

OTHER PUBLICATIONS

Chinese Office Action issued in corresponding Chinese Application No. 201480037387.6 dated Nov. 28, 2016.

International Search Report and Written Opinion issued in corresponding International Application No. PCT/AU2014/050102 dated Aug. 26, 2014.

International Preliminary Report on Patentability issued in corresponding International Application No. PCT/AU2014/050102 dated Jan. 5, 2016.

* cited by examiner

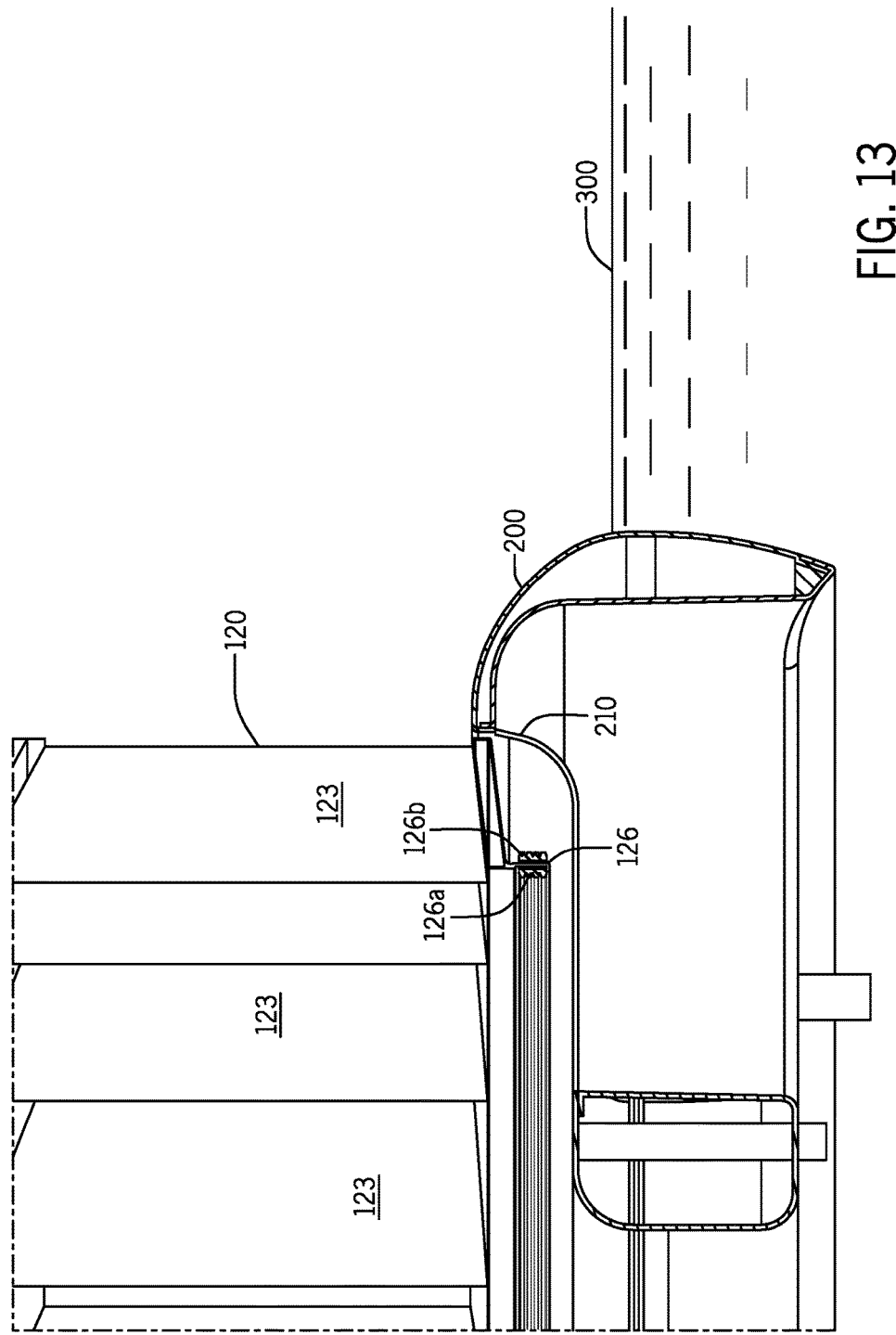

AERODYNAMIC LIFTING DEVICE

CROSS REFERENCE TO RELATED APPLICATIONS

This application is a 35 U.S.C. 371 National Stage of International Application No. PCT/AU2014/050102, titled "AN AERODYNAMIC LIFTING DEVICE," filed on Jun. 30, 2014, which claims priority to Australian Application No. 2013902429, titled "AN AERODYNAMIC LIFTING DEVICE", filed on Jul. 1, 2013; Australian Application No. 2013902430, titled "AN AERODYNAMIC LIFTING DEVICE", filed on Jul. 1, 2013; and Australian Application No. 2013902431, titled "AN AERODYNAMIC LIFTING DEVICE", filed on Jul. 1, 2013, all of which are incorporated by reference herein in their entirety.

FIELD OF THE INVENTION

This invention relates to an aerodynamic lifting device for airborne craft, particularly those with a thrust control or thrust vectoring shroud. The invention is also particularly useful in aerodynamic lifting devices using drum rotor type fans for thrust generation and airborne craft incorporating such devices.

BACKGROUND TO THE INVENTION

Powered airborne craft, manned and unmanned, may be capable of hovering in a stationary position while airborne. Such aircraft may range from craft which operate close to the ground relying on a cushion of air to those capable of free flight and vertical takeoff and landing. Craft operating close to the ground may be designed for transportation and recreational use whereas the free flight craft may operate at generally low altitudes compared to commercial aircraft and may be considered for applications including airport-to-downtown shuttle, tourism applications, home-to-office commuting, search and rescue and surveillance operations.

In a craft free of ground effect, lift can be generated by the acceleration of a mass of air by a fan, propeller, wing, or other system. When a mass of air is changed from rest to a given velocity in a downward direction, an upwardly directed reaction force is produced. In general, the more air that is directed, the less power is required to produce a given lift. This defines a technical challenge because increasing the volume of air generally involves an increase in the size of the craft as evidenced in the large diameter, high speed blades used in helicopters.

To address the above challenge, the applicant has developed an aerodynamic lifting device for airborne craft that provides a more compact form of craft, than a helicopter, and which uses fan blades which are more evenly loaded than comparable helicopter blades. The device uses a drum fan type rotor in an airborne craft with a relatively small footprint and, typically, the drum fan type rotor will be lightweight construction to minimize weight and power required to lift the device. The fan may be described as a drum rotor or radial drum fan, that is, a fan with the blades advantageously occupying an annular region having a radial depth that is less than 25% of the radial pitch of the blades. By placing the rotor blades at a distance from the rotational axis of the fan, a central region within the rotor is conveniently provided for a payload, or in the case of a larger sized craft, a pilot and/or passengers.

The use of such a drum rotor type fan also provides other benefits. One such benefit is that effectively the entire length of a blade is being fully utilized as an aerodynamic device (as compared to the tip of the helicopter blade, described above) since it is vertically disposed and the airflow is radial. Additionally, the design of the drum rotor allows for each blade to be supported at either end via upper and lower support rings (again, as opposed to the cantilevered design of the helicopter blade). Also, simple constant cross-section blade profiles may be used which offer manufacturing cost savings (as opposed to helicopter blades which utilize a complex lengthwise twist to provide the proper angle of attack along the length of the blade).

The rotor must be driven to rotate through a torque transmission means for transmitting torque from a prime mover, and typically, as will become apparent from the discussion below, a plurality of prime movers arranged about the periphery of the rotor body. Torque transmission to drive the rotor of the aerodynamic lifting device raises a number of challenges.

First, the torque transmission means must be capable of transferring the very high levels of tractive effort needed to develop the required high levels of power in the rotor as required to generate lift.

Second, the torque transmission means should be capable of damping any instantaneous high forces to avoid damage to the rotor structure.

Third, radial or normal loads required to transmit the required tractive effort within the torque transmission means should be held to a minimum to avoid damage to the rotor structure and to minimize weight of the craft support structure or chassis.

Fourth, the torque transmission means must be capable of restraining any loads generated by the rotor. In particular, the drive means must be capable of restraining the gyroscopic loads generated both upward and downward in the direction of the axis of the rotor when the rotor rolls or pitches during manoeuvres.

The Applicant has tried a number of design approaches for the torque transmission means. As shown in FIG. 1, the torque transmission means comprises a plurality of prime movers—in the form of internal combustion (IC) engines 110 and associated drive systems—arranged at 120 degree intervals arranged to extend outward of the periphery 11 of the rotor 112 and supporting triangular frame 177. The periphery is formed by a circumference 114 of a drive rim 113 forming the lower portion of the rotor 112. The engines 110 each drive a tooth belt 175 with a flat back 122 providing a friction contact with the rotor 176 and the tooth side of the belt 175 being driven by motor pulleys 186 connected to each of the engines 110 and transmitting torque to the rotor drive rim 118 of the rotor 112. Vertical and radial restraint of the rotor 112 is provided by additional rollers 187 acting on both the radial outer face and axial upper face of the rotor drive rim 118.

This roller arrangement is complex to compensate for gyroscopic forces. In addition, extremely high instantaneous and local loads are directly transmitted to the belt and rotor as well as the rollers. Premature failure is therefore a risk and, in any event, undesirable weight and complexity is added to the device.

SUMMARY OF THE INVENTION

Among objects of the present invention are providing an aerodynamic lifting device comprising an improved torque transmission means to drive the rotor while reducing lifting device weight and complexity and risks of failure presented by high instantaneous and point loads generated by prime movers in earlier applications.

With these objects in view, the present invention provides, in one aspect, an aerodynamic lifting device comprising a chassis; a rotor having a rotational axis and a plurality of rotor blades disposed in an annular ring about the rotational axis supported by the chassis; and a torque transmission means for rotating the rotor wherein said torque transmission means provides tractive force to said rotor by co-operation with at least one complementary and circumferentially extending drive surface of said rotor to transmit tractive force as tangential forces and resultant torque sufficient to drive the rotor and thereby generate lift.

Particularly preferred rotor types are a radial drum fan or a centrifugal fan. The torque transmission means may provide tractive force to the rotor through various devices. Prime movers such as electric motors, internal combustion engines or electromagnetic drive devices (other than conventional electric motors) are most conveniently included within the torque transmission means to generate tractive force. Advantageously, the torque transmission means comprises at least one prime mover mounted to the chassis of the aerodynamic lifting device. However, constructions omitting conventional prime movers may be used. Tractive force could be generated by an air flow (low temperature air flow in particular to completely contrast turbojets and high temperature exhaust gases) generated by a turbine.

Where used, each prime mover generates and transmits the tractive force to rotate the rotor when this force is transmitted to the rotor drive surface. This may be achieved in various ways conveniently through friction but also, otherwise, in such case using a helical belt for example. For example, an output shaft of the prime mover may be connected to a torque transmitting device which co-operates—for example through engaging, or meshing with the rotor drive surface. A wide range of torque transmitting devices including pulleys and gears (including helical gears) may be employed for this purpose. Such torque transmitting devices are advantageously formed with circumferentially extending ribs and grooves, such as in a vee or poly vee configuration which meets a requirement that the torque transmitting devices must withstand perpendicular loads applied in the direction of the axis of the rotor.

This form of torque transmission means does not require an intermediate free moving belt drive component (with associated pulleys and idlers), simplifying construction, reducing weight and avoiding problems of torque and high local instantaneous loads acting on such free belt in a manner that is difficult to control.

As alluded to above, it is also important to generate and balance forces acting on the drive surface of the rotor. To this end, a plurality of prime movers is advantageously arranged at spaced intervals about the rotational axis of the rotor. The torque transmitting devices may be arranged in groups, particularly pairs, about the rotational axis of the rotor. In such case, output shafts of one or more prime movers, each mounted to a support or chassis for the aerodynamic lifting device, are connected to respective torque transmitting devices, such as a pulley or gear, which desirably each bear against a corresponding length (also described as a "point") of the circumferential drive surface to transmit torque to the rotor. It will be appreciated that where each torque transmitting device bears against the circumferentially extending drive surface, a loaded point is formed on that drive surface. Advantageously, each torque member in a pair of transmitting devices is arranged to apply an equal and opposite friction or normal force on the drive surface at the loaded points to reduce propensity for bending of the rotor due to forces normal to the tractive face.

The circumferentially extending drive surface may be formed on a circumferentially extending rim of the rotor, which may be inward of the rotor periphery, this rim having an inner surface facing inward toward the rotational axis of the lifting device and an outer surface facing radially outward from the rotational axis. The drive rim would form a lower portion of the rotor. Particularly advantageously, circumferentially extending drive surfaces are formed on each of the inner and outer surfaces of the rotor rim, which may be referred to as a drive rim. Each drive surface co-operates with at least one said prime mover. More advantageously, a different prime mover co-operates with each drive surface though advantageously at the same point but opposite side of the drive rim so as to provide the above described equal and opposite friction and normal forces to reduce propensity the for bending. Described above was a preferred arrangement in which the torque transmitting devices are arranged in pairs. In this case, each torque transmitting device of the pair co-operates, at the same point relative to the drive rim, with a respective drive surface on the drive rim. It will be appreciated that, in such arrangement, the rotatable drive rim is disposed between pairs of torque transmitting devices in a manner balancing radial loads on the rotor to avoid high instantaneous point loads so avoiding bending.

Advantageously, each circumferentially extending drive surface is provided with complementary geometry to that provided on the torque transmitting devices as described above. In such case, grooved, such as vee or poly vee, geometry may conveniently be provided on each circumferentially extending drive surface for example by fixing a grooved belt to each drive surface such that each comprises a plurality of circumferentially extending grooves. This enables the superior tractive forces of grooved belts to be exploited, conveniently through friction, whilst avoiding the radial loads or belt tensions that would occur if a free moving belt was used. Further, the use of grooved geometry, as herein described, assists in restraining necessary lateral gyroscopic loads experienced with the above described rotor.

Whereas the torque transmitting devices, especially pulleys or gears, are of metallic construction, the drive surfaces of the rotor are advantageously of polymeric, especially elastomeric, construction that enhances the effect of frictional forces and assists in the distribution of high local radial friction loads to the drive rim (which is typically of lightweight construction) thereby avoiding high local stresses and subsequent damage to the drive rim.

Tractive force may be optimized by providing the ribs that form the poly grooves with an angle that is selected to provide high tangential tractive forces while minimizing the necessary radial or normal load required to generate friction. Optimal angle is a function, among other parameters, of the coefficient of friction of the material forming the torque transmission devices and rotor drive rim. Desirably, the ribs that form the grooves also have sufficient strength in the transverse or axial direction to sustain the high lateral gyroscopic forces generated by the rotor when the airborne lifting device executes roll and pitch manoevres.

For purposes of avoiding doubt, using a grooved, e.g vee or poly vee, free moving belt drive component would be undesirable because of these radial loads and belt tensions that, whilst not typically an issue in auto applications, would cause significant problems if used in the above described aerodynamic lifting device. It will be appreciated that the grooves need not have a perfect vee shape. The target is a groove shape that is optimized to tractive force transmission to the rotor at acceptable manufacturing cost.

The configuration of the above described torque transmission means may enable the position of the rotor to be restrained in one or both of the following directions:

i. radially about the centre of the aerodynamic lifting device; and ii. axially in the upward and downward direction of the axis of the aerodynamic lifting device. Restraint in this direction is primarily created by gyroscopic forces generated by rotor rotation when the lifting device (or a craft including it) executes a roll or pitch manoevre or combination thereof.

The torque transmitting, devices, such as pulleys or gears, may advantageously be biased into position against the drive rim by a loading means, for example a biasing means, such as mechanical or pneumatic springs or other hydraulic devices. This assists torque transmission but also restrains the position of the rotor. The loading means, which may be monitored using a suitable force measuring device such as a load transducer including a load cell or load washer, may apply an adjustable force, for example a spring force, between respective torque transmitting devices, such as each pulley in a pair of pulleys driven by a prime mover. The adjustable force is desirably set as sufficient to develop the frictional force required to transmit desired torque to the rotor, particularly to generate lift.

In addition, the torque transmitting devices and prime movers should be fixed to the chassis by rigid or flexible restraints which may contain damping means, such as spring(s), to restrain prime mover movement and damp any vibration generated during operation of the rotor.

The aerodynamic lifting device incorporates a support or chassis for the torque transmission means and other components as described above. The preferred chassis is of toroidal shape which has inherently good strength to weight properties and may be designed with a volume for flotation purposes (hollow or filled with buoyant material). The aerodynamic lifting device can be deployed for waterborne use and, desirably, can land and take off from a water surface. For this to be possible, the rotor needs to be clear of the water surface during take off and landing so that it can spin freely. A buoyant chassis structure can be shaped, ideally toroidally, to have sufficient buoyancy to hold the rotor body above water level.

Such a chassis may be provided with a surface to guide airflow exiting from the rotor of the fan and so thrust of an airborne craft incorporating the above described aerodynamic lifting device.

Another aspect of the invention provides an aerodynamic lifting device comprising a chassis; a rotor having a rotational axis supported by the chassis; and a rotor having a plurality of rotor blades disposed in an annular ring about the rotational axis; and a torque transmission means for rotating the rotor such that, on operation of the torque transmission means, lift is generated wherein said chassis for supporting said rotor and torque transmission means is of toroidal shape. Other features, as described above, may be included.

An airborne craft incorporating the aerodynamic lifting device as described above forms another aspect of the invention.

In order to generate lifting thrust for such an airborne craft, air flow from the rotor is re-directed by a shroud that surrounds the rotor, from the radial out flow direction as provided by the rotor to a generally downward direction to thus produce an upward thrust. The shroud may comprise a flexible skirt attached to the area around the top part of the rotor which deflects the airflow to provide attitude, thrust and directional control of the airborne craft according to principles as described in the Applicant's U.S. Pat. Nos. 7,556,218, 8,181,902 and 8,646,721, the contents of which are hereby incorporated herein by reference. Such a shroud has a fluid exit region advantageously defined by a plurality of shroud portions, advantageously in the form of petals in an arrangement as described in detail in U.S. Pat. No. 8,646,721, the contents of which are hereby incorporated herein by reference.

DESCRIPTION OF THE DRAWINGS

The fluid dynamic device and airborne craft of the invention may be more fully understood from the following description of preferred embodiments thereof made with reference to the accompanying drawings in which:

FIG. 13 is a schematic showing portion of a chassis and rotor of an aerodynamic lifting device for waterborne use in accordance with a further inventive embodiment.

DETAILED DESCRIPTION OF PREFERRED EMBODIMENTS

Figure 2:
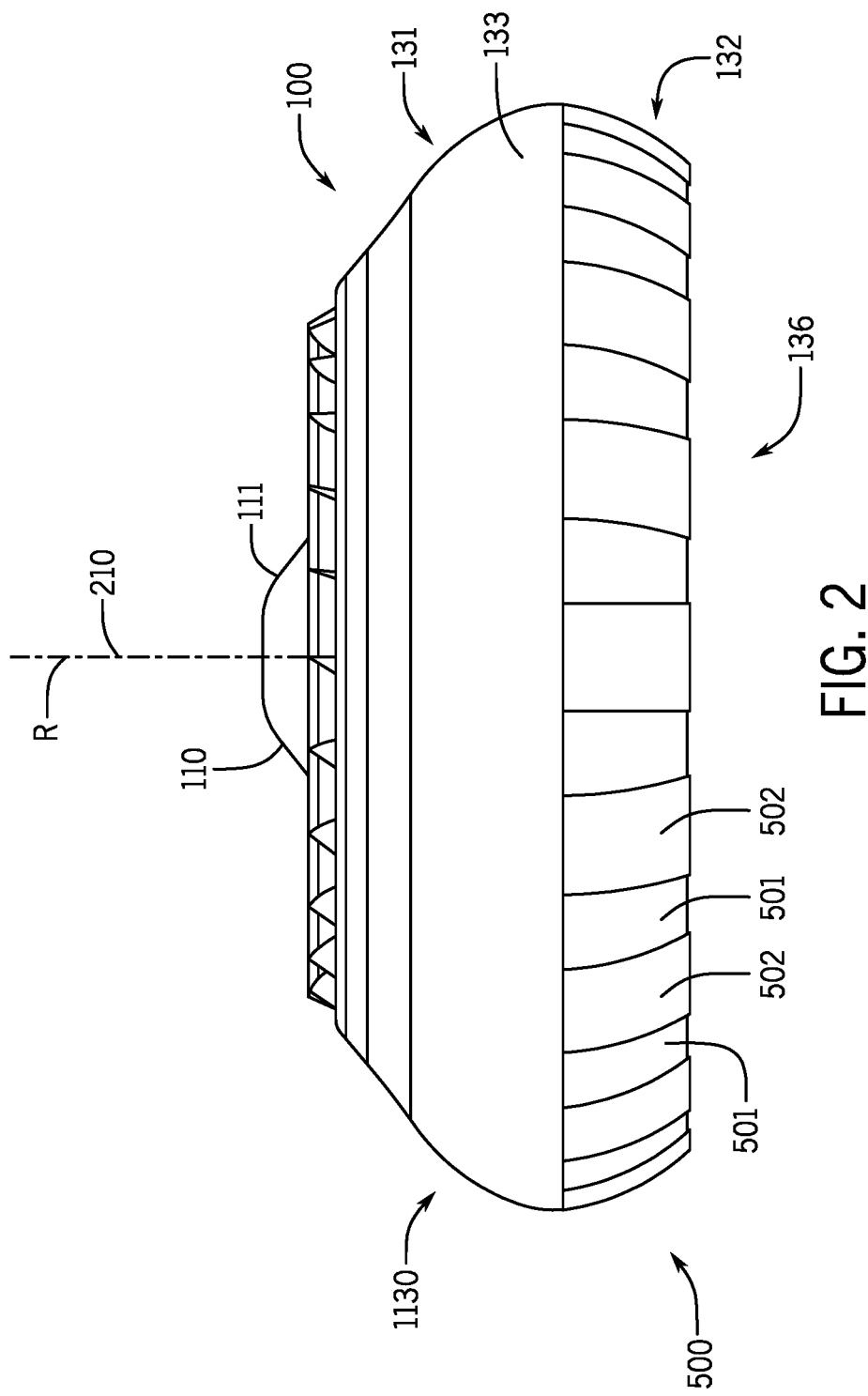
FIG. 2 is an isometric view of an airborne craft comprising an aerodynamic lifting device in accordance with one embodiment of the present invention.

FIG. 2 shows an airborne craft 100 developed by the applicant and intended to be used in a wide variety of applications. The craft 100 is approximately 2.4 meters wide and comprises a central load carrying space 110 that provides a cockpit operating area 111 for an operator (not shown) while maximising the area available for fluid flow, that is airflow, by a radial drum fan, having a rotor 120 as shown in other drawings. The air flow to the rotor 12 flows past the central area of the craft (that is, through the central load carrying space 110) and is expelled radially by the drum rotor fan 120. The radial airflow is re-directed to generate downwards thrust by flexible shroud 1130.

Operation of rotor 120 and deflection of air flow by shroud 1130 to direct thrust is described in detail in U.S. Pat.

Nos. 7,556,218, 8,181,902 and 8,646,721, the contents of which have been incorporated herein by reference.

Figure 1:
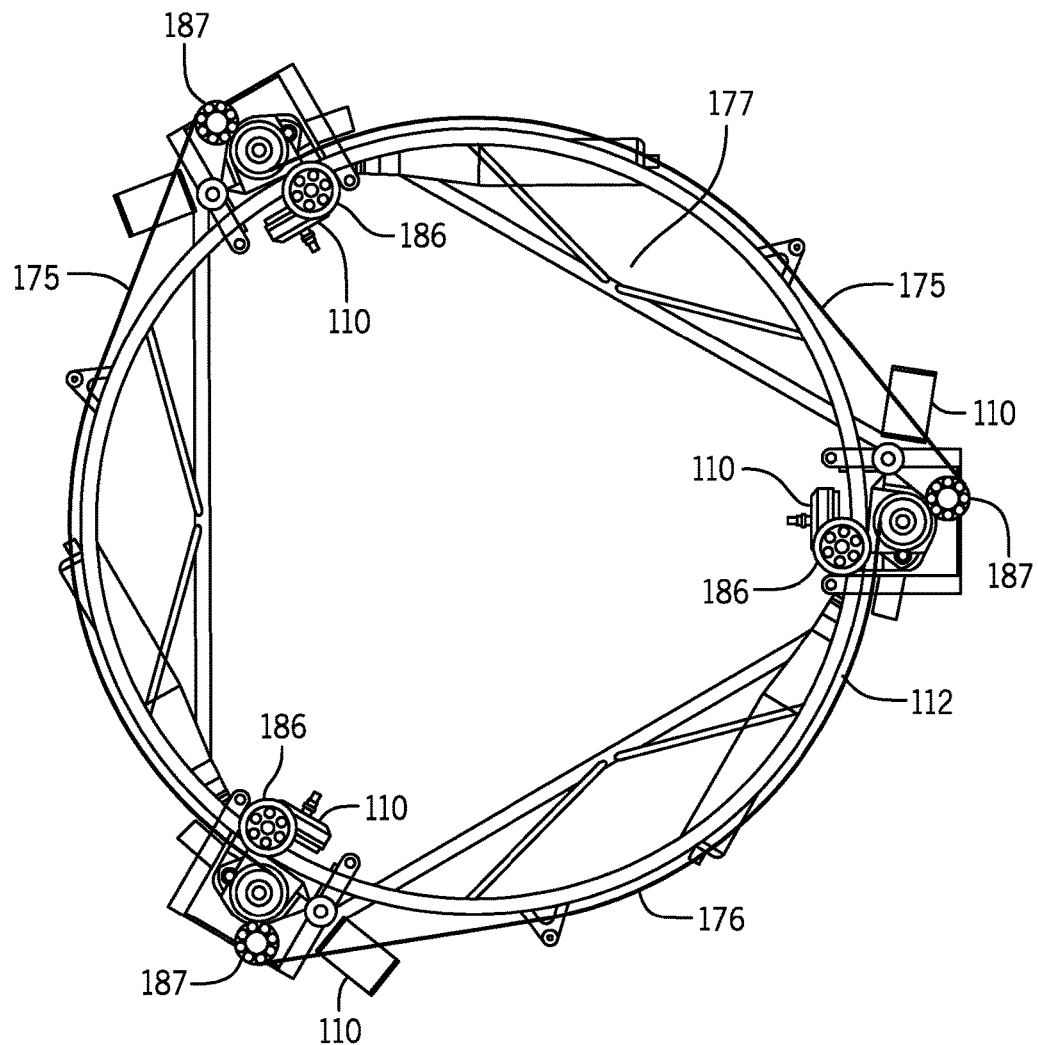
FIG. 1 is a schematic drawing of a prior art aerodynamic lifting device and airborne craft.

The shroud 1130 of the craft in FIG. 1 creates a generally downward facing fluid exit area in the shape of a flat annular ring (not shown). The airflow exiting the shroud 1130 through fluid exit region 132 is therefore in a direction generally parallel to a central or longitudinal axis 210 of the craft 100.

The fluid exit region 132 of the shroud 1130 comprises a plurality of shroud portions or flaps in the form of petals, 500, comprising a series of inner petals 501, and a series of outer petals 502, all these petals being of a material with a degree of flexibility. The petals 501, 502 are flexibly hinged at upper regions of each to the rigid part of the shroud 133. These petals 501, 502 are controlled by actuators (not shown but described in the patents cross-referenced herein) forming part of a control system so as to alter the position and/or direction of the resultant thrust acting on the craft 100.

Further detailed description of the petal shroud or skirt 1130 is described in the Applicant's U.S. Pat. No. 8,646,721 which has been incorporated herein by reference. Further description of a preferred embodiment of the aerodynamic lifting device used to generate lift of the craft 100, in accordance with the invention, now follows.

Figure 3:
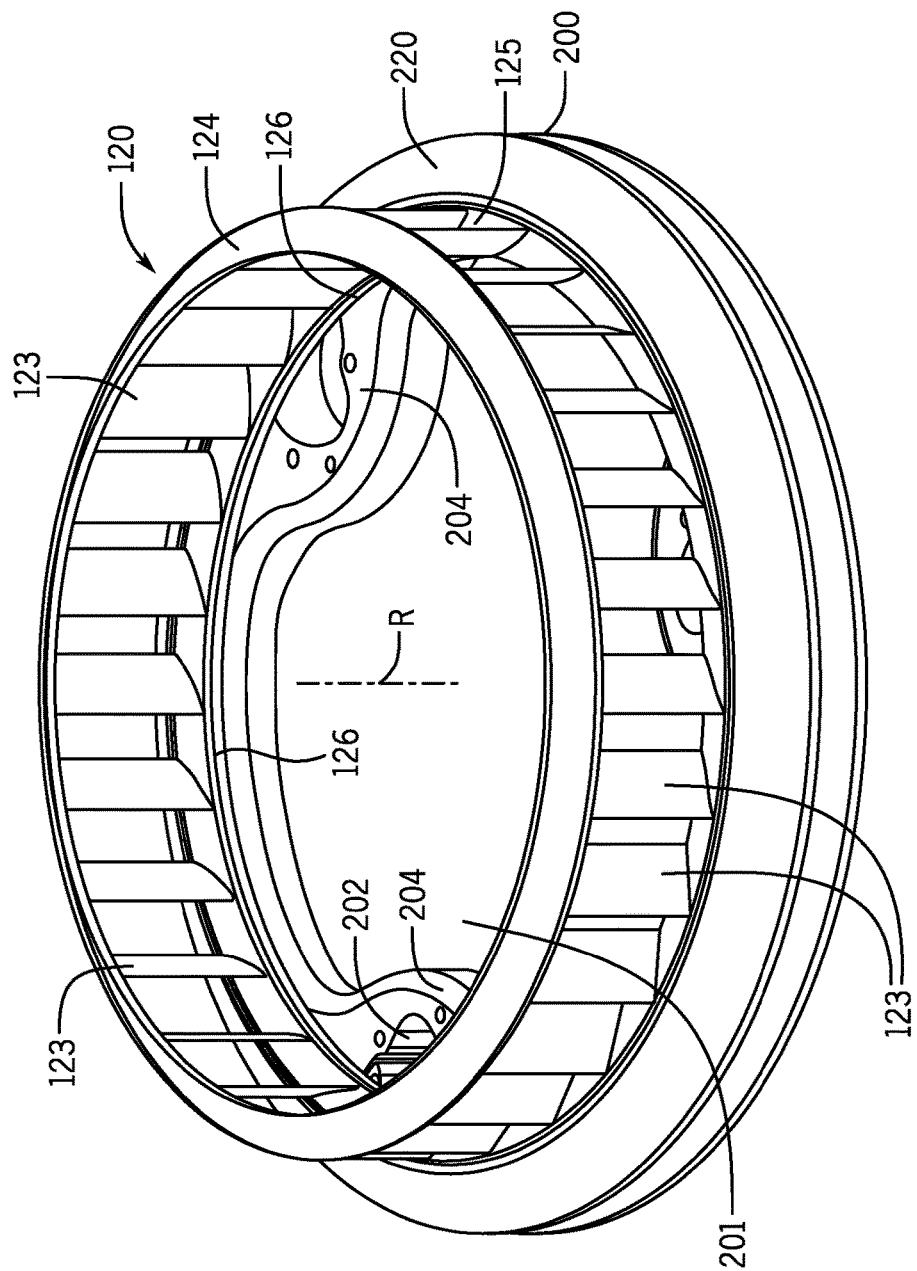
FIG. 3 is a top perspective view of a rotor and support or chassis for the airborne craft shown in FIG. 2.
Figure 4:
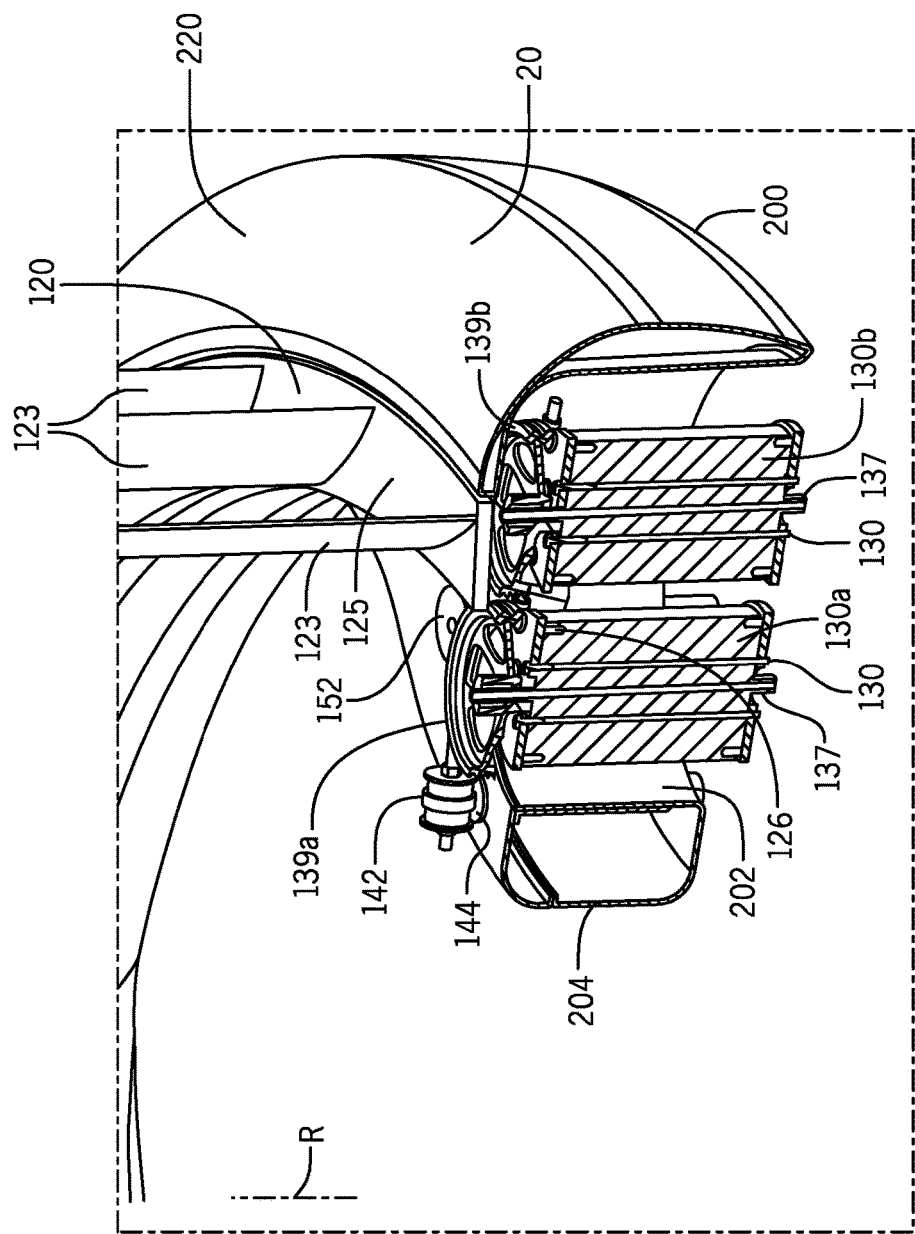
FIG. 4 is a detail partial isometric section view showing a torque transmission means of the aerodynamic lifting device.
Figure 7:
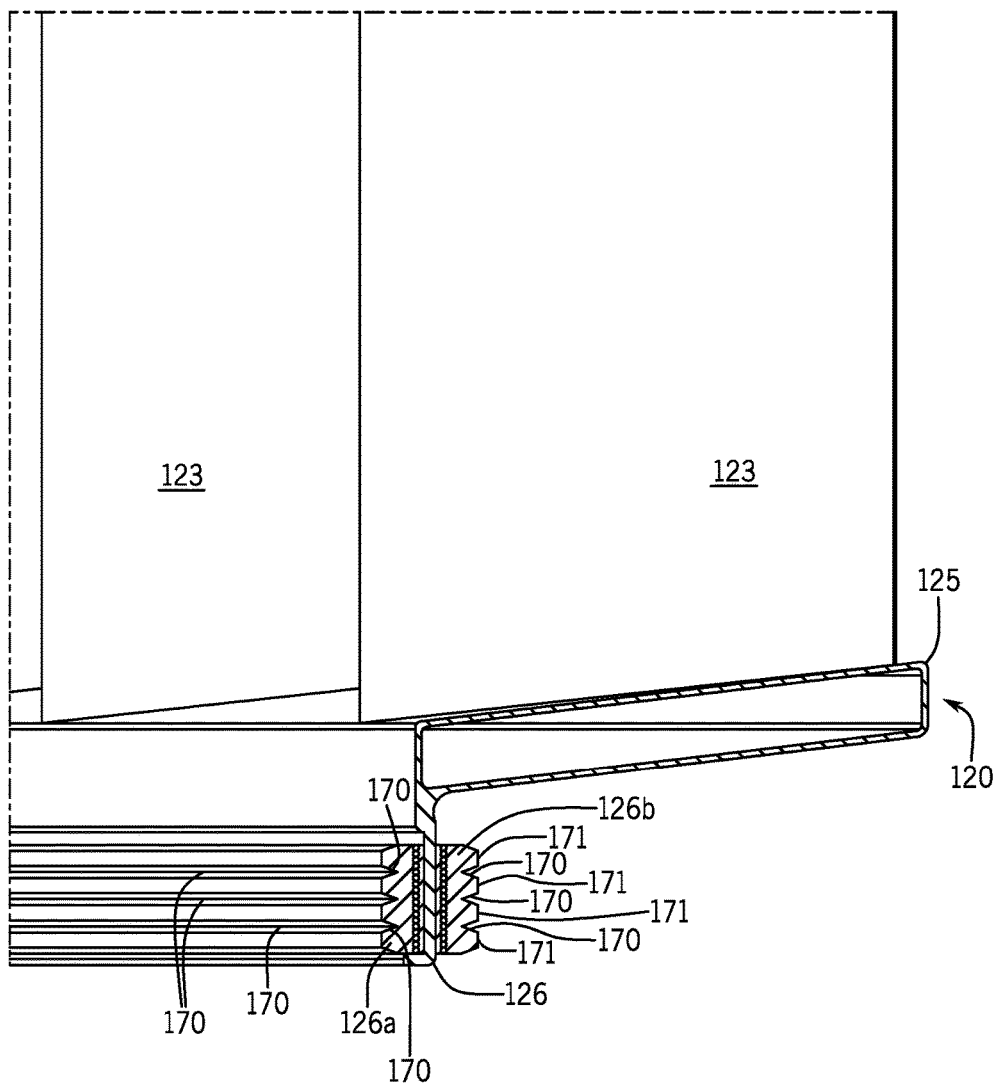
FIG. 7 is a detail side section view of a drive rim of the rotor body of FIGS. 4 to 6.
Figure 8:
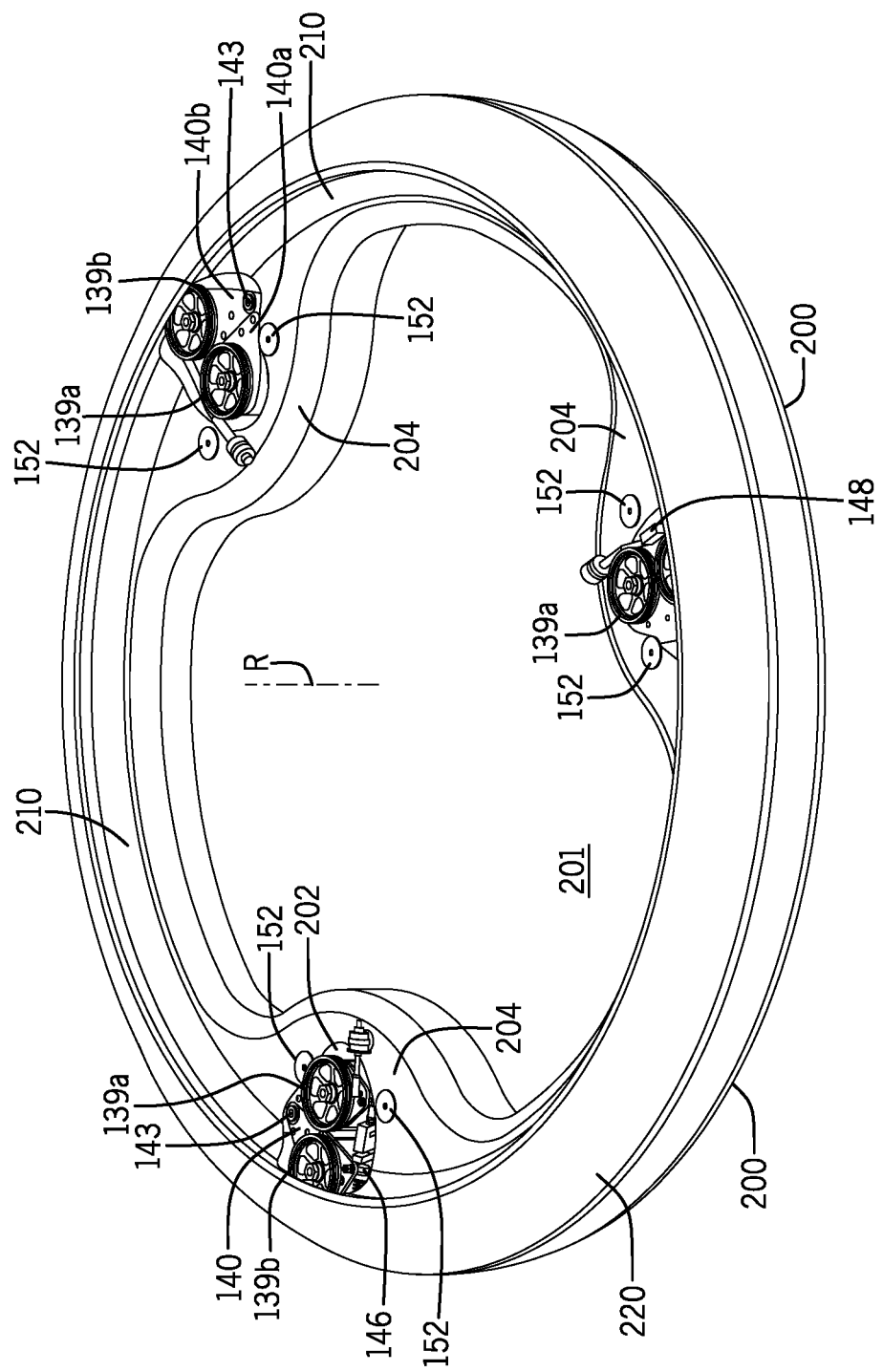
FIG. 8 is a top isometric view of a support or chassis mounting prime movers and torque transmitting devices of torque transmission means as shown in FIGS. 4 to 7.

Referring to FIGS. 3, 4 and 7, there is shown rotor 120 of a radial drum fan for generating airflow to operate craft 100. The essentially circular rotor 120, of lightweight composite structure, has an upper portion provided with a plurality of rotor blades 123 disposed in an annular ring about the rotor 120 rotational axis R. Rotor blades 123 are equally spaced and arranged vertically, being contained by an upper capping ring 124 and a lower drive ring 125.

Drive ring 125 has a radially inwardly located lower portion in the form of circumferential drive rim 126 with inner and outer circumferentially extending surfaces 126a and 126b. Rotor 120 must be provided with sufficient tractive force to generate rotation and lift, this requiring a torque transmission system between a prime mover and the rotor 120.

The torque transmission system shown here, with particular reference to FIGS. 4 to 6, 8 and 9 comprises a plurality of prime movers in the form of electric motors 130. Six electric motors 130 are provided, the motors 130 being mounted in pairs in bays 202 formed in extensions 204 of a toroidally shaped support chassis 200 described further below. More specifically, each motor 130 is mounted on a pivoting cradle 140 having planar arms pivotally connected to the motors 130 and chassis 200. Bays 202 and cradles 140 are located at near 120 degree intervals of arc about the rotational axis R. The intervals of arc may be selected to compensate for minor variations in circularity of rotor drive rim 126.

The output shaft 137 of each motor 130 protrudes through an aperture 141 formed in the top of each cradle 140 and is connected to drive a torque transmitting device being circular drive pulley 139. The connection includes bearings to support the radial and axial loads on pulleys 139 which must bear these loads. Pulleys 139 are of metallic construction.

The radially inward motor 130a of each motor pair drives an inner pulley 139a and the radially outward motor 130b drives an outer pulley 139b to provide tractive effort and torque to drive rim 126. It will be understood that, in an alternative, a single motor could drive both pulleys 139a and 139b with suitable transmission components to enable such objective to be achieved.

Metallic paired pulleys 139a and 139b provide torque to the drive rim 126 and rotor 120 by friction contact with the drive rim 126. To this end, as shown in particular detail in FIGS. 6 and 7, the drive rim 126 has respective inner and outer circumferentially extending drive surfaces 126a and 126b which mesh with pulleys 139a and 139b. These drive surfaces 126a and 126b are of elastomeric construction to enhance the frictional forces generated by metallic pulleys 139 and assist in the distribution of high local radial friction loads to the drive rim 126 thereby avoiding high local stresses and subsequent damage to the drive rim 126.

In addition and to the same end, flat surface geometry is not sufficient to generate the required frictional forces and, particularly advantageously, both drive surfaces 126a and 126b are provided with circumferentially extending grooves 170 which mesh, inducing significant frictional forces, with corresponding ribs 172 formed on the pulleys 139a and 139b to enable torque transmission. Such grooves 170 are here in poly vee configuration and this may be fabricated by adhesively attaching the back (or non-grooved face) of a commercially available poly vee type belt, here with tensioners 190, around the full circumference of both the inner and outer drive surfaces 126a and 126b. Alternatively, the grooved or poly vee configuration could be formed in, or otherwise attached to, the drive surfaces 126a and 126b.

Grooves 170 and intervening ribs 171 have an angle selected to provide high tangential tractive forces while minimizing the necessary radial or normal load required to generate friction and required torque. Ribs 171 also have sufficient strength in the transverse or axial direction to sustain the high lateral gyroscopic forces generated by the rotor 120 when the airborne craft 100 executes roll and pitch manoevres.

While poly vee and other belts typically include tension members 190 (in the form of high tension fibres), these—whilst required in auto drive applications—may be omitted in this application.

It will be appreciated that heat is generated as metallic pulleys 139 frictionally contact elastomeric drive surfaces 126a and 126b. However, as rotor 120 rotates, the drive surfaces 126a and 126b lose sufficient heat—when not in contact with pulleys 139—to avoid unacceptable temperature rise of the drive surfaces 126a and 126b.

Figure 9:
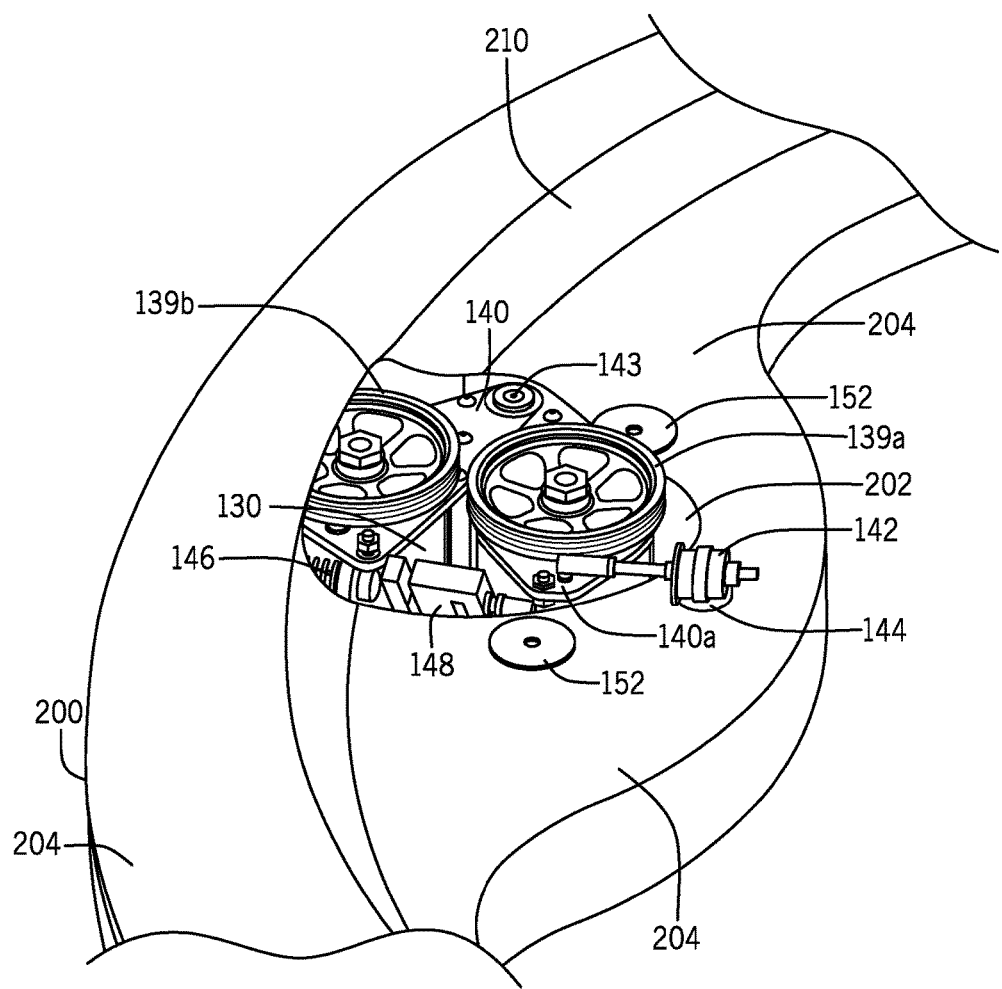
FIG. 9 is a detail top isometric view of FIG. 8 and showing the mounting for a torque transmission means as shown in FIGS. 4 to 6.
Figure 10:
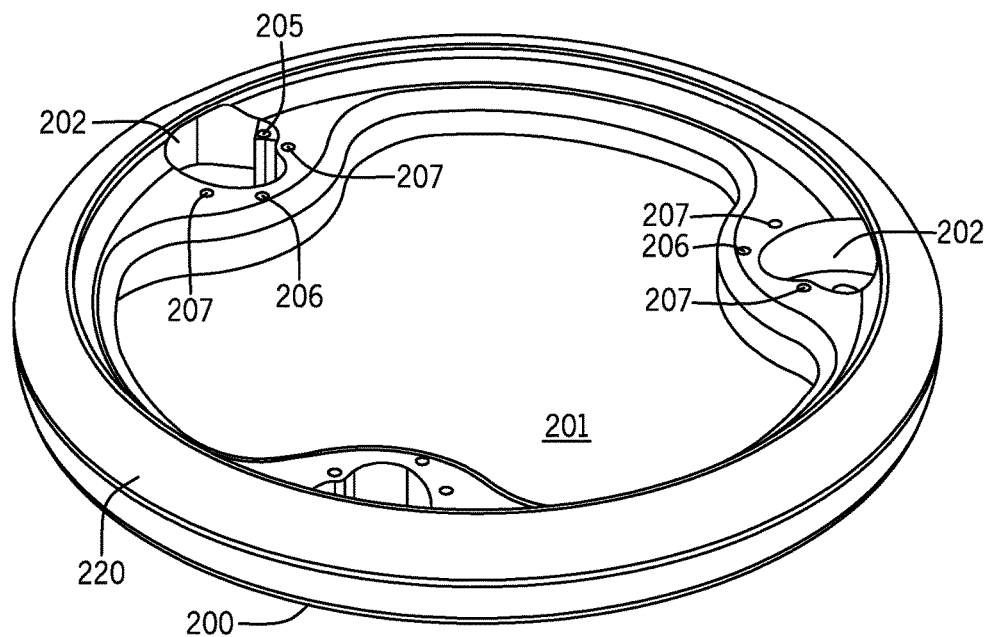
FIG. 10 is a top isometric view of the chassis of FIGS. 8 and 9.
Figure 11:
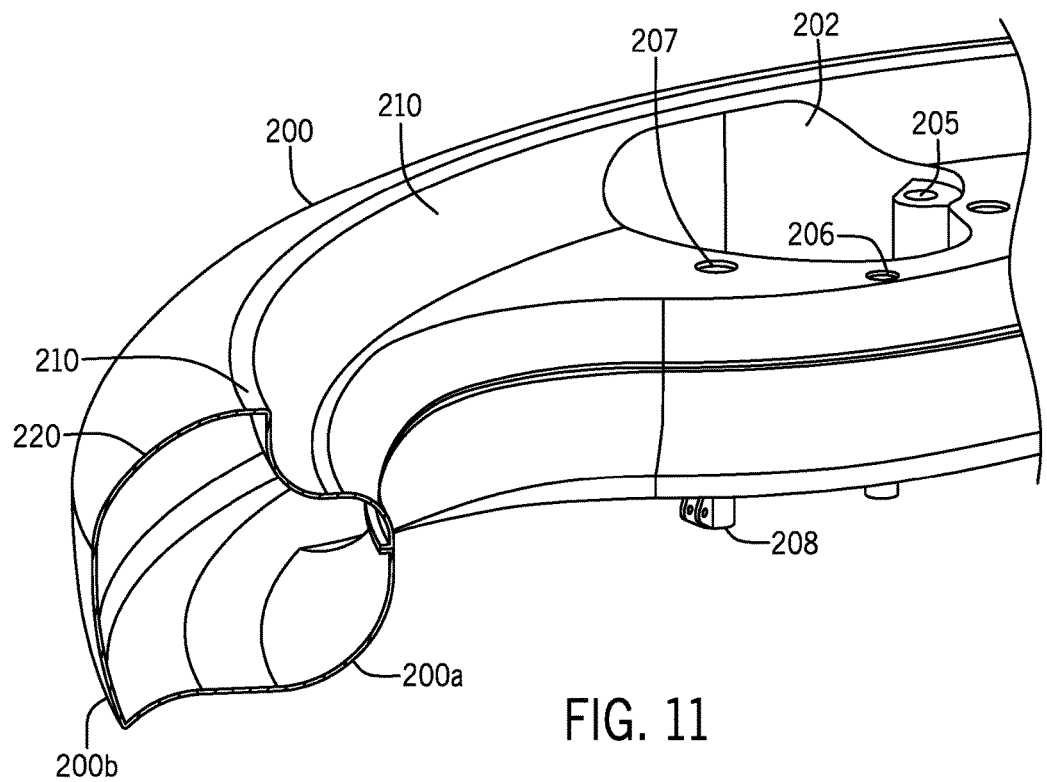
FIG. 11 is a detail top partial isometric section view of FIG. 10.
Figure 12:
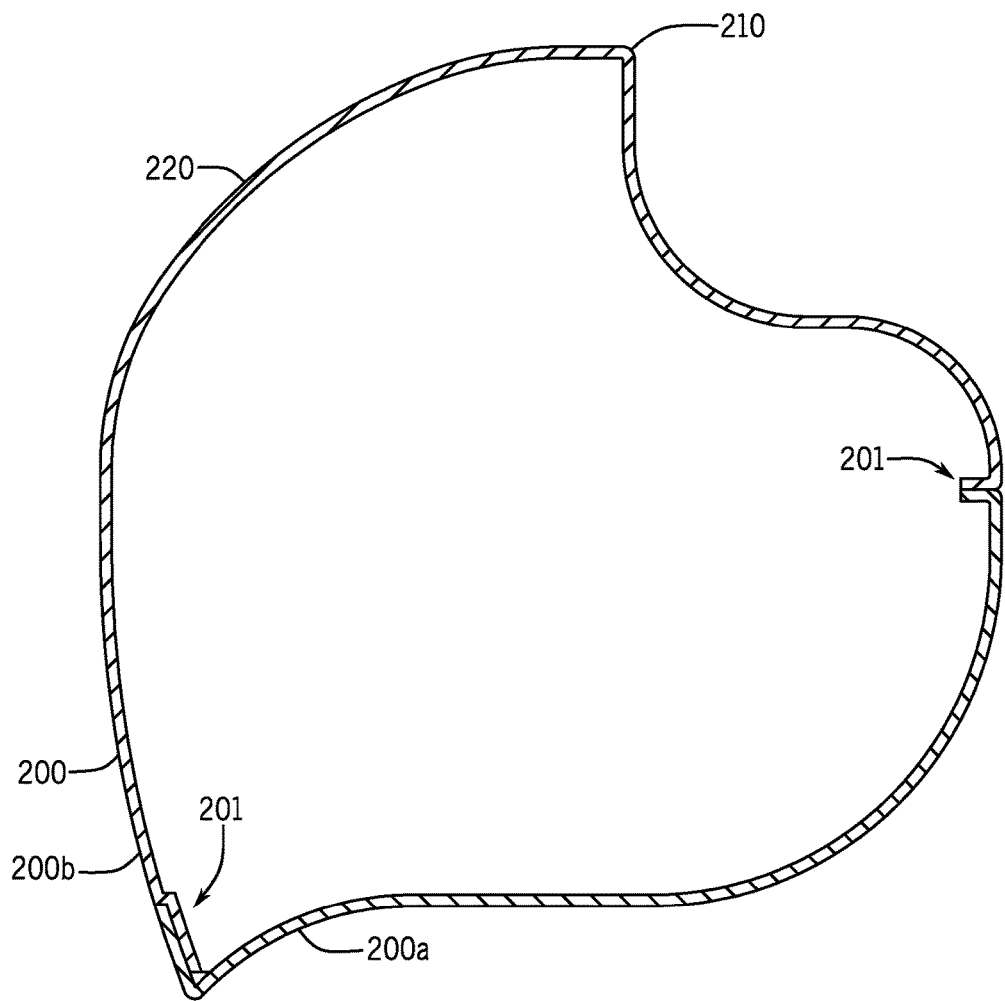
FIG. 12 is a section view of the chassis of FIGS. 9 to 11.

Support brackets or cradles 140 each include an arm pivotally mounted, through individual or shared pivots 143 and are arranged in pairs made up of respective inward and outward cradles 140a and 140b. The inward cradles 140a are restrained by damped restraints 142 mounted to bosses 144 in the chassis 200. Cradles 140, 140a, 140b are biased or loaded towards each other by a loading means, such as a pneumatic or mechanical spring (here a mechanical spring 146 as shown in FIGS. 9 and 10), for applying force between each pulley 139a and corresponding pulley 139b. This force, here spring force, is advantageously adjustable and is set to be sufficient to develop the friction force needed to transmit the required torque to the drive rim 126 and rotor 120. Consequently, each pulley 139a and 139b of a pulley pair is also arranged radially opposite each other such that radial loads on the drive rim 126 are balanced to prevent bending of the drive rim 126 which is of a lightweight composite construction.

The mechanical springs 146 are monitored by load transducer 148 which measures spring force. Cockpit and lifting surface (not shown in this figure) is mounted to bosses 152 (equivalent to bosses 207) of FIGS. 4 and 9 to 12.

Figure 5:
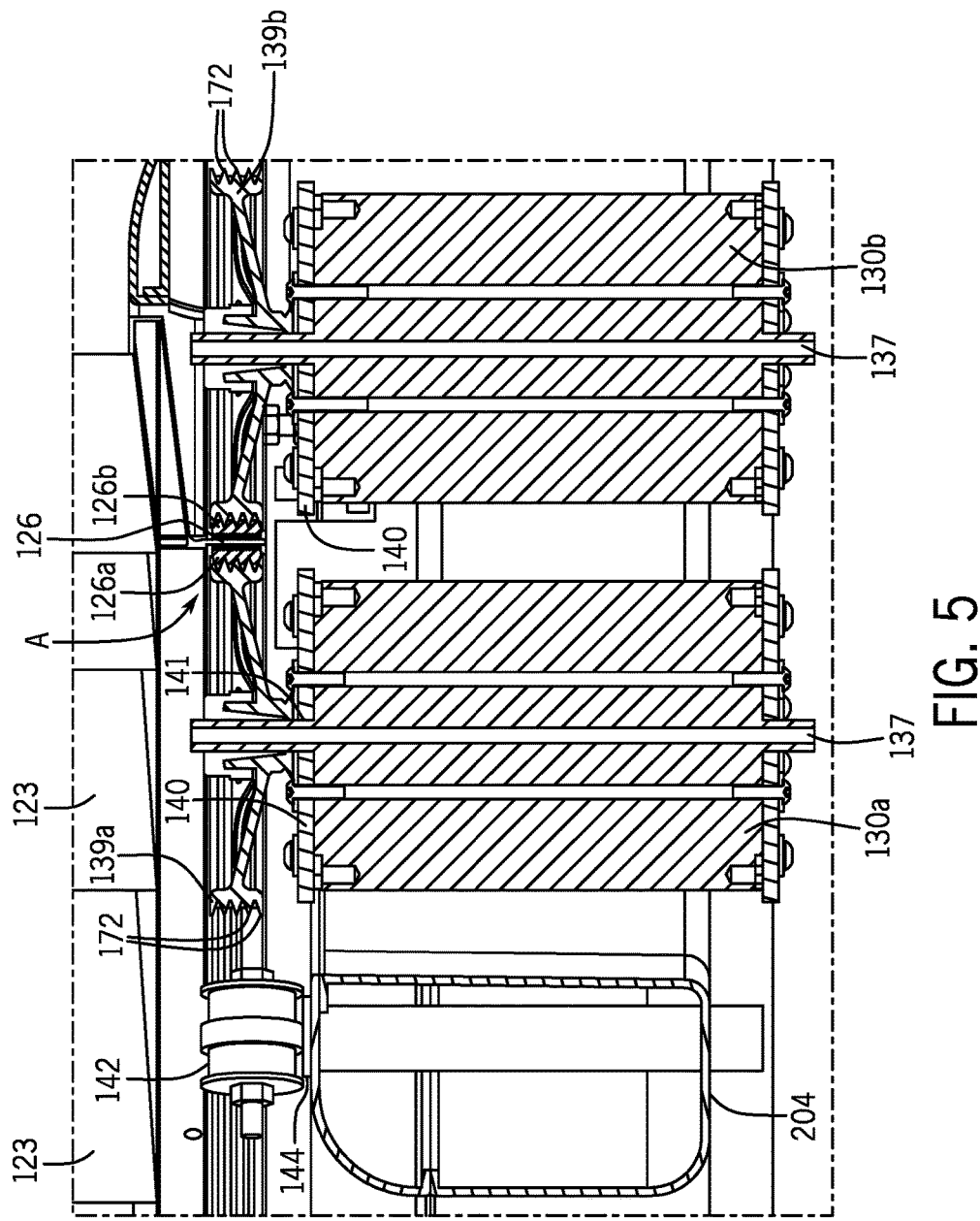
FIG. 5 is a side section view of the torque transmission means shown in section in FIG. 4.
Figure 6:
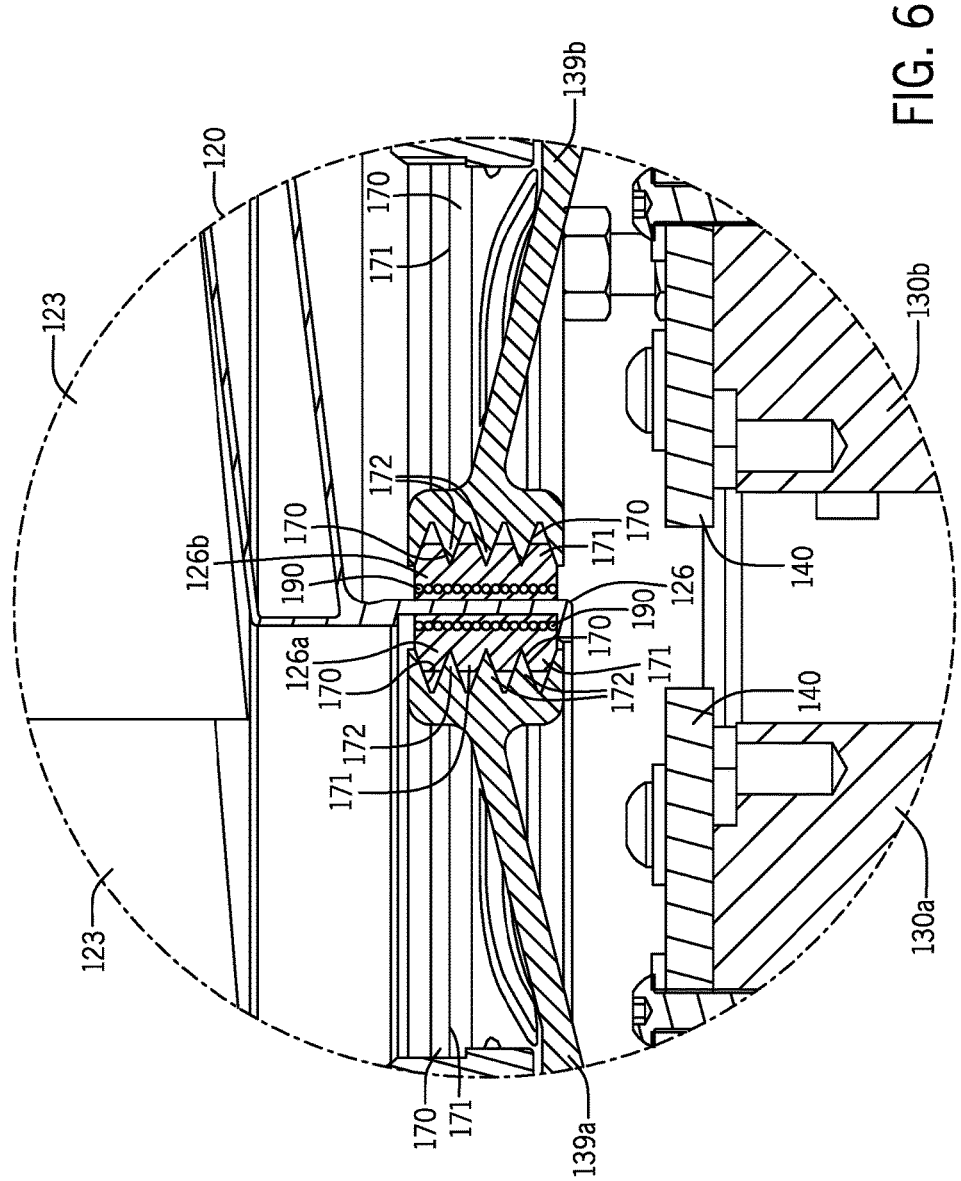
FIG. 6 is a partial detail side section view of portion of the torque transmission means and rotor drive rim as shown in FIGS. 4 and 5 as indicated by arrow A.

Pulleys 139a and 139b, and the electric motors 130, are fixed at mounting bosses 144 to the chassis 200 of craft 100 by rigid motor restraints 142 (as shown ion FIGS. 5 and 9)

which contain spring or damping means to control any vibration generated by operation of the motors 130 and rotor 120.

The above described arrangement enables restraint of the rotor 120 in radial and axial directions. Radial movement of rotor 120 must be minimized to minimize gas leakage (air driven by the drum rotor fan to generate lift) between the static chassis 200 and the rotating rotor 120. This must be achieved while providing for the manufacturing variability of the rotor 120 whose diameter may vary by 2-3 mm (in approximately 600 mm in this instance). The waviness of the drive rim 126 may also vary by a similar amount. Axial restraint in the upward and downward direction of the rotational axis R of rotor 120 and craft 100 compensates for gyroscopic forces generated when craft 100 executes a roll or pitch manoevre or combination thereof.

Further description of toroidal chassis 200, for connecting and supporting, through mounting, the cockpit, attendant loads and the above described torque transmission systems of the craft 100, now follows with reference to FIGS. 8 to 13. The chassis 200 is very different in structure and weight from the complex chassis of structural members 190 formed into a heavier frame 177 of triangular shape as shown in FIG. 1.

Chassis 200 has a toroidal body of composite structure which could employ carbon fibres, glass fibres or aramid fibres as well as honeycomb structures, for example of paper, aramid fibre or aluminium with an opening 201 in the centre to locate rotor body 120 and other components. Chassis 200 has a primary structure or skin of this composite material, the skin including a curved surface 220 for guiding airflow from the rotor 120 to generate lift and thrust for craft 100.

Chassis 200, which is constructed from two separately moulded sections 200a and 200b joined at locations 201 may provide support or restraint for multiple loads including lifting loads generated by the lifting surfaces of the craft 100; gravitational forces generated by the rotor 120 and torque transmission system as above described; loads generated by the electric motors 130, cradles 140 and associated drive pulleys 139; and loads from the mass of the cockpit and other payloads including mass of any pilot, batteries and fuel. In addition, the chassis provides support and restraint of the loads generated by stator blades attached to the cockpit as well as the control surfaces such as yaw vanes and skirt petals 501, 502. Description of the stator, yaw vanes and petals is provided in one or more of cross-referenced U.S. Pat. Nos. 7,556,218, 8,181,902 and 8,646,721.

Chassis 200 is formed with inward extensions 204 having bays 202 which include pivot locators 205 for cradles 140 and mountings for motor restraints 206. The cockpit and lifting surfaces are mounted on bosses 207. Vertical face 210, connecting with an upper limit of guide surface 220 mates with the outer edge of rotor 120 to prevent air leakage and contain the lower moving parts (not shown). Chassis 200 also has multiple suspension mount locations 208.

Further, craft 100 may be deployed for waterborne use and it can land and take off from a water surface 300. This requires rotor 120 to be elevated from the water surface 300 during take off and landing so that it can spin freely in the air. Toroidal chassis 200 is shaped with sufficient buoyancy to elevate the rotor 120 of craft 100 above water surface 300 as shown in FIG. 13.

Other modifications and variations of the fluid dynamic device of the invention may be apparent to skilled readers of this disclosure. Such modifications and variations are deemed within the scope of the present invention.

The invention claimed is:

1. An aerodynamic lifting device comprising:
   a chassis;
   a rotor of a radial drum or centrifugal fan supported by the chassis having a rotational axis and a plurality of rotor blades disposed in an annular ring about the rotational axis;
   a torque transmission means for rotating the rotor comprising a plurality of prime movers for generating tractive force arranged at spaced intervals of arc about the rotational axis of the rotor, each prime mover being connected to a corresponding torque transmitting device for providing tractive force for rotating said rotor and each prime mover and corresponding torque transmitting device being arranged in pairs about the rotational axis of the rotor; and
   a circumferentially extending drive rim for the rotor having a circumferentially extending inner drive surface and a circumferentially extending outer drive surface, each drive surface being engageable with a complementary torque transmitting device of each said pair of torque transmitting devices for transmitting tractive force as tangential forces and resultant torque to drive the rotor and generate lift;
   wherein said circumferentially extending drive rim is disposed between and rotatable by said paired torque transmitting devices.

2. The aerodynamic lifting device as claimed in claim 1 wherein said inner and outer surfaces of said drive rim and said paired torque transmitting devices are each provided with complementary grooved geometry, said inner and outer surfaces having a plurality of circumferentially extending grooves for meshing with complementary grooves of said torque transmitting devices.

3. The aerodynamic lifting device as claimed in claim 1 wherein said torque transmitting devices are biased into position against said drive rim by a loading means to restrain the position of the rotor.

4. The aerodynamic lifting device as claimed in claim 3 wherein said loading means is a spring having spring force to develop a frictional force required to transmit torque to the rotor.

5. The aerodynamic lifting device as claimed in claim 1 wherein said torque transmitting devices and prime movers are fixed to said chassis by restraints.

6. The aerodynamic lifting device as claimed in claim 5 wherein said restraints include damping means.

7. The aerodynamic lifting device as claimed in claim 1 wherein each prime mover and torque transmitting device of said torque transmission means is pivotally mounted on said chassis.

8. The aerodynamic lifting device as claimed in claim 1 wherein said chassis is of toroidal shape.

9. The aerodynamic lifting device as claimed in claim 8 wherein said chassis is buoyant.

10. The aerodynamic lifting device as claimed in claim 8 wherein said toroidal shaped chassis is provided with a guide surface to guide airflow exiting from the rotor of the fan and vector thrust.

11. An aerodynamic lifting device comprising:
   a chassis;
   a rotor of a radial drum or centrifugal fan supported by the chassis having a rotational axis and a plurality of rotor blades disposed in an annular ring about the rotational axis;
   a torque transmission means for rotating the rotor comprising a plurality of prime movers for generating tractive force arranged at spaced intervals of arc about the rotational axis of the rotor, each prime mover being connected to a corresponding torque transmitting device for providing tractive force for rotating said rotor and each prime mover and corresponding torque transmitting device being arranged in pairs about the rotational axis of the rotor, such that, on operation of the torque transmission means lift is generated wherein said chassis for supporting said rotor and transmission means is of toroidal shape; and a circumferentially extending drive rim for the rotor having a circumferentially extending inner drive surface and a circumferentially extending outer drive surface, each drive surface being engageable with a complementary torque transmitting device of each said pair of torque transmitting devices for transmitting tractive force as tangential forces and resultant torque to drive the rotor and generate lift;

wherein said circumferentially extending drive rim is disposed between and rotatable by said paired torque transmitting devices.

12. The aerodynamic lifting device as claimed in claim 11, wherein said chassis is buoyant for waterborne use, having buoyancy to elevate said rotor above a water surface during take off and landing.

13. An airborne craft incorporating the aerodynamic lifting device of claim 1 and comprising a shroud having a flexible skirt attached to an area around a top part of the rotor to provide altitude, thrust and directional control of the airborne craft.

14. The airborne craft incorporating the aerodynamic lifting device of claim 11, comprising a shroud having a flexible skirt attached to an area around an top part of the rotor to provide altitude, thrust and directional control of the airborne craft.

15. The airborne craft as claimed in claim 13, wherein the shroud has a fluid exit region defined by a plurality of shroud portions in the form of movable petals.

16. The airborne craft as claimed in claim 14, wherein the shroud has a fluid exit region defined by a plurality of shroud portions in the form of movable petals.

17. The aerodynamic lifting device as claimed in claim 1 wherein a first torque transmitting device of said paired torque transmitting devices is engageable with said circumferentially extending inner surface of said drive rim and a second torque transmitting device of said paired torque transmitting devices is engageable with said circumferentially extending outer surface of said drive rim.

18. The aerodynamic lifting device as claimed in claim 1 wherein a prime mover and a torque transmitting device of each said pair of torque transmitting devices are disposed at the same point on opposite sides of said circumferentially extending drive rim.

* * * * *